United States Patent [19]

Masuda et al.

[11] Patent Number: 5,231,359
[45] Date of Patent: Jul. 27, 1993

[54] CERAMIC RESONANCE TYPE ELECTROSTATIC SENSOR APPARATUS

[75] Inventors: Noboru Masuda, Kawaguchi; Tetsuo Ohsawa, Tokyo; Takashi Sugimura, Sagamihara, all of Japan

[73] Assignee: Murata Mfg. Co., Ltd., Nagaokakyo, Japan

[21] Appl. No.: 526,247

[22] Filed: May 18, 1990

[30] Foreign Application Priority Data

| May 19, 1989 | [JP] | Japan | 1-126234 |
| Aug. 10, 1989 | [JP] | Japan | 1-207216 |
| Oct. 6, 1989 | [JP] | Japan | 1-261756 |
| Oct. 17, 1989 | [JP] | Japan | 1-269829 |

[51] Int. Cl.$^5$ .................................................. G01R 27/26
[52] U.S. Cl. .................................... 324/675; 324/458
[58] Field of Search ............... 324/675, 681, 682, 72, 324/72.5, 458; 333/214, 215, 219.1

[56] References Cited

U.S. PATENT DOCUMENTS

| 3,384,789 | 5/1968 | Teshima . | |
| 3,621,385 | 11/1971 | Ichijo | 324/682 |
| 3,835,388 | 9/1974 | Dowell, Jr. | 340/825.71 |
| 3,935,540 | 1/1976 | Hart et al. | 330/10 |
| 4,149,119 | 4/1979 | Buchheit | 324/458 |
| 4,152,641 | 5/1979 | Hughes et al. | 324/675 |
| 4,295,092 | 10/1981 | Okamura | 324/675 |
| 4,338,582 | 7/1982 | Presser | 333/215 |
| 4,387,369 | 6/1983 | Klein et al. | 324/464 |
| 4,459,541 | 7/1984 | Fielden et al. | 324/679 |
| 4,812,785 | 3/1989 | Pauker | 333/215 |
| 4,864,255 | 9/1989 | Yoshida | 331/158 |
| 4,868,488 | 9/1989 | Schmall | 324/635 |
| 4,879,523 | 11/1989 | Cotreau | 330/257 |

FOREIGN PATENT DOCUMENTS

| 675586 | 8/1979 | U.S.S.R. | 333/215 |
| 720698 | 10/1980 | U.S.S.R. | 333/215 |

OTHER PUBLICATIONS

Direct–Coupled Gyrators with Floating Parts Siemens AG Jan. 3, 1967.

Primary Examiner—Jack B. Harvey
Assistant Examiner—Maura K. Regan
Attorney, Agent, or Firm—Rogers, Howell & Haferkamp

[57] ABSTRACT

A ceramic resonance type electrostatic sensor apparatus with an oscillator at a fixed frequency including a first ceramic resonator which has a fixed resonance frequency, a detecting unit for detecting a capacitance between the detecting unit and an object to be detected, a resonating circuit including a second ceramic resonator and having a resonance point which varies with the small change in capacitance detected by the detecting unit, a high impedance circuit connected between the oscillator and the resonating circuit, and a high impedance circuit connected between the resonating circuit and the detecting circuit.

24 Claims, 13 Drawing Sheets

CERAMIC RESONANCE TYPE ELECTROSTATIC SENSOR APPARATUS

BACKGROUND OF THE INVENTION

1. Field of the Invention

The present invention relates to a ceramic resonance type electrostatic sensor apparatus for detecting a change in small capacitance of an object to be detected by using a high-frequency oscillation signal.

2. Description of the Prior Art

A generally used electrostatic sensor apparatus is designed to change the oscillation frequency of an oscillator by changing a capacitance, as an external capacitance, used in a tank circuit of the oscillator. However, the sensitivity of this sensor apparatus is low. For this reason, an apparatus having a higher sensitivity (designed to obtain an AM-modulated wave by changing the capacitance of a capacitor of a resonator having a resonance frequency slightly deviated from the oscillator frequency of an oscillator) has been used more often recently. An electrostatic sensor apparatus comprises an oscillator 1, a resonator 2, a detecting portion 3 for detecting a change in capacitance between the detecting portion and an object to be detected, a detector 4, and an amplifier 5, as shown in FIG. 1. The oscillator 1 and the resonator 2 respectively include resonator elements. The resonance frequency of the resonator element of the resonator 2 is modulated in accordance with a small change in capacitance detected by the detecting portion 3. The modulated resonance frequency is then extracted as an output signal from the resonator 2 and is detected and amplified.

In a widely used electrostatic sensor apparatus of this type, one of the resonator elements of the oscillator and the resonator 2 is constituted by a strip line. However, when a resonator element is to be constituted by a strip line, a strip line length must be ¼ the wavelength of light. Since a long strip line is required, it is difficult to reduce the apparatus in size.

In order to reduce the size of the apparatus, Japanese Patent Laid-Open No. 58-85948 discloses an apparatus wherein the resonator elements of the oscillator 1 and the resonator 2 are constituted by dielectric resonator elements. If the resonator elements are constituted by dielectric elements, the length of each resonator element can be reduced to $\epsilon^{-\frac{1}{2}}$ that of the resonator element constituted by a strip line. If this dielectric element is constituted by a ceramic element, since ceramics have dielectric constants $\epsilon$ of 20 to 40, the apparatus can be greatly reduced in size. In addition, if each dielectric element is constituted by a ceramic element, since the Q values of ceramics are as high as 200 to 300, the resonator element can be expected to have a higher sensitivity than the resonator element constituted by a strip line.

In an electrostatic sensor apparatus of this type, however, since the operating point of the resonator element of the resonator 2 is set at a point deviated from the resonance frequency of the resonator element of the oscillator 1, an impedance at this operating point is normally 200 to 500 Ω or more. If a load having an impedance lower than this impedance is coupled to a peripheral portion of the resonator element of the resonator 2, the resonator element is subjected to Q damping (the Q is decreased). That is, the ceramic resonator element cannot exhibit its original characteristics (that the Q is large), and hence the detection sensitivity cannot be greatly increased.

Furthermore, in the electrostatic sensor apparatus shown in FIG. 1, assume that the impedance or Q of an object to be detected is low, and ion components in, e.g., a human body or water are to be detected. In this case, if an object detecting electrode of the detecting portion 3 and the resonator are directly coupled to each other, the Q of the resonator element of the resonator 2 is considerably decreased due to the low impedance of the object. Therefore, in an electrostatic sensor apparatus whose output voltage depends on the large Q of such a resonator element, the detection performance is decreased due to a great decrease in detection output, and the apparatus cannot be used in practice.

In the electrostatic sensor apparatus shown in FIG. 1, if dielectric resonator elements, especially ceramic resonator elements, are used in place of the respective resonator elements of the oscillator 1 and the resonator 2, the apparatus can be reduced in size. In addition, the sensitivity of the apparatus can be greatly increased because of the high Q values (200 to 300) of ceramics. Therefore, the apparatus can detect a small capacitance of about $1 \times 10^{-5}$ pF.

FIG. 2 shows the oscillator 1 as a characteristic feature of the electrostatic sensor apparatus in FIG. 1. In this apparatus, a trimmer capacitor 13 for finely adjusting the oscillation frequency is connected to a ceramic resonator element 11 constituting the oscillator 1.

In such a high-sensitivity electrostatic sensor apparatus, the tuning point of the oscillator 1 and the resonator 2 must be accurately set. The capacitance of the trimmer capacitor 13 is known to include a fixed capacitance component $C_0$ and a variable capacitance component $\Delta C$. The fixed capacitance component $C_0$ is considerably large and greatly varies in each product. Since the fixed capacitance component $C_0$ also serves as an oscillator element as indicated by dotted lines in FIG. 2, when a very high oscillation frequency of 1 GHz to 10 GHz is to be used, the oscillation frequency of the oscillator 1 greatly fluctuates due to this variation in $C_0$. Even if the variation in resonance frequency of the ceramic resonator element 11 is suppressed to the rated value or less, a predetermined oscillation frequency as a target frequency cannot be obtained. Therefore, even if the capacitance is adjusted by the variable capacitance component $\Delta C$, the oscillator 1 and the resonator 2 cannot be set at a predetermined resonance point.

Assume that the resonance point can be accurately set. Even in this case, if a stray distributed capacitance is produced between the electrostatic sensor apparatus and peripheral members when the apparatus is mounted on a unit to be measured, the oscillation frequency is disturbed.

Although the trimmer capacitor 13 is ideally mounted near the ceramic resonator element 11, the capacitor 13 is often required to be mounted at a position separated from the ceramic resonator element 11 due to limitations in terms of a user's requirement, a position of a unit to be measured at which the electrostatic sensor apparatus is mounted and the like. In such a case, the leads of the trimmer capacitor 13 are elongated, and portions $L_1$ and $L_2$ of the leads may become capacitance components or inductance components. These components may cause variation in oscillation frequency or parasitic vibrations, resulting in an unstable oscillation frequency.

Recently, a demand has arisen for parallel processing of detection signals based on capacitances detected by an electrostatic sensor apparatus in different forms, or more accurate analysis of detection signals. In order to achieve parallel processing of detection signals, a plurality of sensor circuit systems each constituted by the components from the oscillator 1 to the amplifier 5 may be adjacently arranged. In order to realize accurate signal analysis, at least two sensor circuit systems each constituted by the components from the oscillator 1 to the amplifier 5 may be formed, and a differential output of output signals of the respective systems may be obtained.

In the case wherein the plurality of censor circuits each constituted by the components from the oscillator 1 to the amplifier 5 are arranged adjacent to each other, if a small capacitance is to be detected especially at a high sensitivity of about $1 \times 10^{-5}$ pF, it is difficult to match the oscillation frequencies of the respective systems because of the influences of external disturbances other than detection signals or a stray distributed capacitance produced when the electrostatic sensor apparatus is mounted in a unit to be measured. If the oscillation frequencies of the respective systems are deviated from each other even by a slight value, mutual interference such as resonance occurs between the oscillation frequencies of the respective systems. For example, if one the other has an oscillation frequency of $f_0'$, a beat frequency of $f_0' - f_0$ or $f_0' + f_0$ is generated due to mutual interference. This frequency acts as an external disturbance, and accurate signal processing cannot be performed.

SUMMARY OF THE INVENTION

The present invention has been made to solve the above-described conventional problems, and has as its first object to provide a ceramic resonance type electrostatic sensor apparatus which is reduced in size and has a very high sensitivity.

It is the second object of the present invention to provide a high-sensitivity electrostatic sensor apparatus in which the Q of a resonator element of a resonator is not decreased even when a small capacitance of an object to be detected which has a low impedance or a low Q value is to be detected.

It is the third object of the present invention to provide a small, high-sensitivity electrostatic sensor apparatus which allows easy adjustment of an oscillation frequency and can generate a stable oscillation frequency without causing a fluctuation and a variation in oscillation frequency due to external factors.

It is the fourth object of the present invention to provide a multiple electrostatic sensor apparatus which can perform accurate signal processing without causing mutual interference between the oscillation frequencies of the respective systems.

In order to achieve the first object, according to the present invention, there is provided a ceramic resonance type electrostatic sensor apparatus comprising an oscillator using a ceramic resonator element, a detecting portion for detecting a change in capacitance between the detecting portion and an object to be detected, and a resonator including a ceramic resonator element having a resonance point which is changed in accordance with a small change in capacitance detected by the detecting portion, wherein peripheral portions of the ceramic resonator element of the resonator are constituted by high-impedance circuits.

In order to achieve the second object, according to the present invention, in the electrostatic sensor apparatus having the above-described arrangement, a C-L converter for converting a capacitance change detected by the detecting portion into an inductance change is arranged between the detecting portion and the resonator.

In order to achieve the third object, according to the present invention, there is provided an electrostatic sensor apparatus comprising an an oscillator, including a resonator element, for outputting an oscillation-frequency signal, a detecting portion for detecting a change in capacitance between the detecting portion and an object to be detected, and a resonator having a resonance point with the oscillation-frequency signal which is changed in accordance with a small change in capacitance detected by the detecting portion, wherein the oscillator includes a variable capacitance diode for variably adjusting an oscillation frequency of the oscillator, a variable potential converter for variably adjusting an operating voltage to be applied to the variable capacitance diode, and a high frequency separating circuit arranged between the variable capacitance diode and the variable potential converter, and the resonator element of the oscillator is constituted by a dielectric resonator element.

In order to achieve the fourth object, according to the present invention, there is provided a multiple electrostatic sensor apparatus comprising a plurality of sensor circuit systems each including an oscillator for outputting a frequency signal, a tuning circuit having a resonator element independent of the oscillator, and a resonance point frequency which is changed in accordance with a change in external capacitance detected by the detecting portion, the plurality of sensor circuit systems include one common oscillator, and a frequency signal is supplied from the common oscillator to the tuning circuit of each system.

DETAILED DESCRIPTION OF THE PREFERRED EMBODIMENTS

Figure 3:
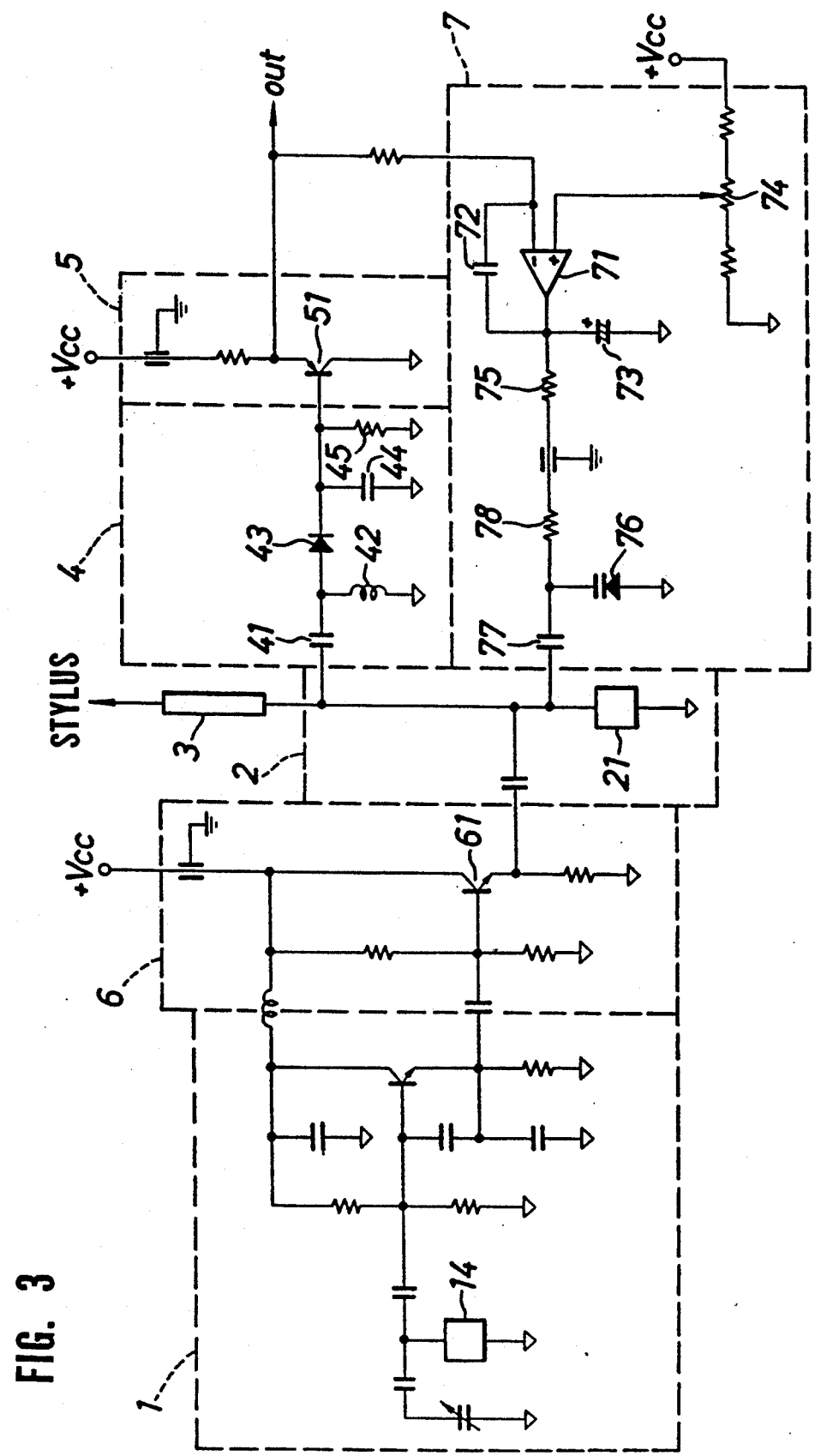
FIG. 3 is a circuit diagram showing an electrostatic sensor apparatus according to an embodiment of the present invention.

An embodiment of the present invention will be described below with reference to the accompanying drawings. FIG. 3 is a circuit diagram showing a ceramic resonance type electrostatic sensor apparatus according to an embodiment of the present invention. The apparatus of this embodiment comprises an oscillator 1, a high-impedance converter 6, a resonator 2, a detector 4, an amplifier 5, and an AFC circuit 7. Note that reference symbol ▽ in FIG. 3 denotes a ground point.

A known oscillator is used as the oscillator 1. The oscillator 1 includes a ceramic resonator element for oscillating a predetermined frequency fixed in the range of 1 GHz to 10 GHz. The oscillator 1 generates an oscillation signal having a high frequency and supplies it to the resonator 2 through the high-impedance converter 6. The resonator 2 is constituted by a ceramic resonator element 21. An electrode plate, a needle, and the like for detecting a change in capacitance of an object to be detected (not shown) are connected to a detecting portion 3.

Figure 4:
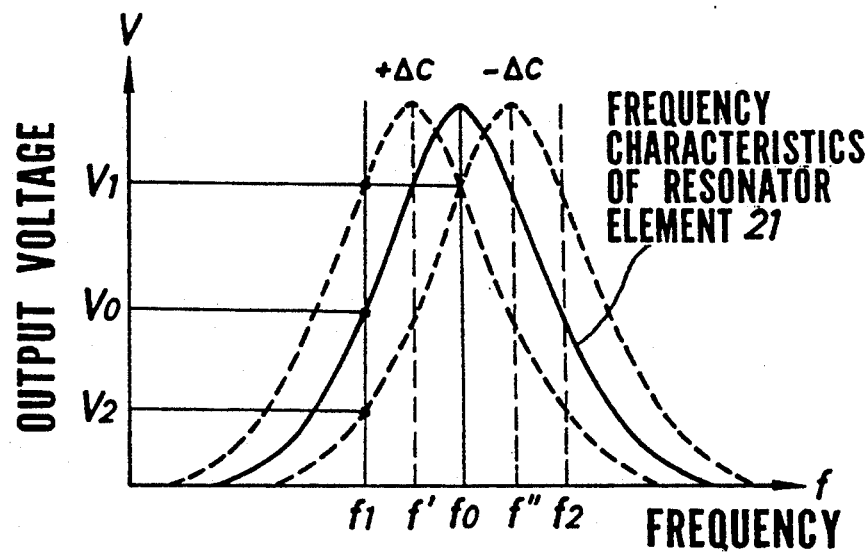
FIG. 4 is a graph showing the frequency characteristics of a ceramic resonator element.

The resonator 2 has frequency characteristics shown in FIG. 4. An oscillation frequency $f_1$ of the oscillator 1 is set at a position slightly deviated from a resonance frequency $f_0$ of the resonator 2. The oscillation frequency $f_1$ may be set by a so-called up porch or down porch scheme. In the up porch scheme, the oscillation frequency is set at the position of a frequency $f_2$ located on the right side of the resonance frequency $f_0$ of the resonator 2. In the back porch scheme, the oscillation frequency is set at the position of the frequency $f_1$ located on the left side of the resonance frequency $f_0$. In this embodiment, the oscillation frequency is fixed to the position of the frequency $f_1$ as a back porch. The resonance frequency $f_0$ of the resonator 2 is shifted in accordance with a change in capacitance of the object which is detected by the detecting portion 3. If a capacitance C is changed by $+\Delta C$, the resonance frequency $f_0$ is shifted to $f'$. In this manner, the resonator 2 changes the resonance frequency in accordance with a change in capacitance of the object. In this case, since the oscillation frequency of the oscillator 1 is fixed to $f_1$, if no change in capacitance is detected, an output voltage of $V_0$ is output from the resonator 2. If a capacitance change of $+\Delta C$ is detected, an output voltage $V_1$ is output from the resonator 2. In this manner, the resonance frequency of the resonator 2 is shifted in accordance with a change in capacitance of the object. Upon this shift, an output voltage V corresponding to a change in capacitance is output from the resonator 2. In this embodiment, the detection range of changes in capacitance is set from 0 to $+\Delta C$. That is, the preset operation range of output voltages is set from $V_0$ to $V_1$. The position of the oscillation frequency $f_1$ with respect to the resonance frequency $f_0$ is set to cause the interval between the output voltages $V_2$ and $V_1$ to fall within a linear region of the frequency characteristics of the resonator 2 on its frequency characteristic curve, thereby increasing the detection sensitivity. That is, the preset operation range $V_0$ to $V_1$ is set by selecting a high-impedance portion of the linear region.

The Q of a ceramic dielectric element is generally high (large). For this reason, if the resonator elements of the apparatus are constituted by ceramic resonator elements 14 and 21, higher detection sensitivity can be expected. However, if the resonator 2 is directly connected to the oscillator 1, since the impedance of the oscillator 1 is lower than that of the resonator 2 at its operating point, the Q of the resonator 2 including the ceramic resonator element 21 is decreased. As a result, an output voltage at the resonance point is decreased, and the original performance (that the Q is high) of the ceramic resonator element 21 is impaired. In order to solve such a problem, in this embodiment, the high-impedance converter 6 is arranged between the oscillator 1 and the resonator 2. The high-impedance converter 6 is constituted as a high-impedance circuit by coupling a transistor 61 to circuit elements such as a resistor and a capacitor. The transistor 61 is emitter-follower connected to the ceramic resonator element 21 and applies a high impedance to it. In addition, the transistor 61 serves to eliminate mutual interference between the oscillator 1 on the side of the ceramic resonator element 14 and the resonator 2 on the side of the ceramic resonator element 21.

Figure 5:
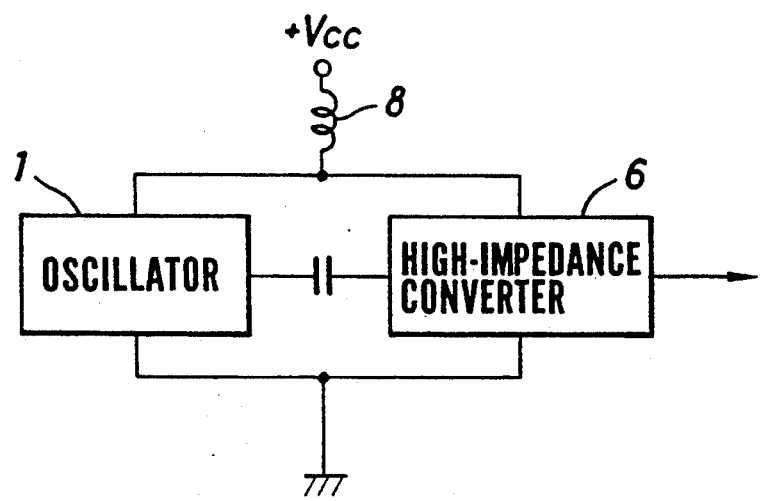
FIG. 5 is an equivalent circuit diagram of a circuit for processing an ultra high-frequency signal.
Figure 6:
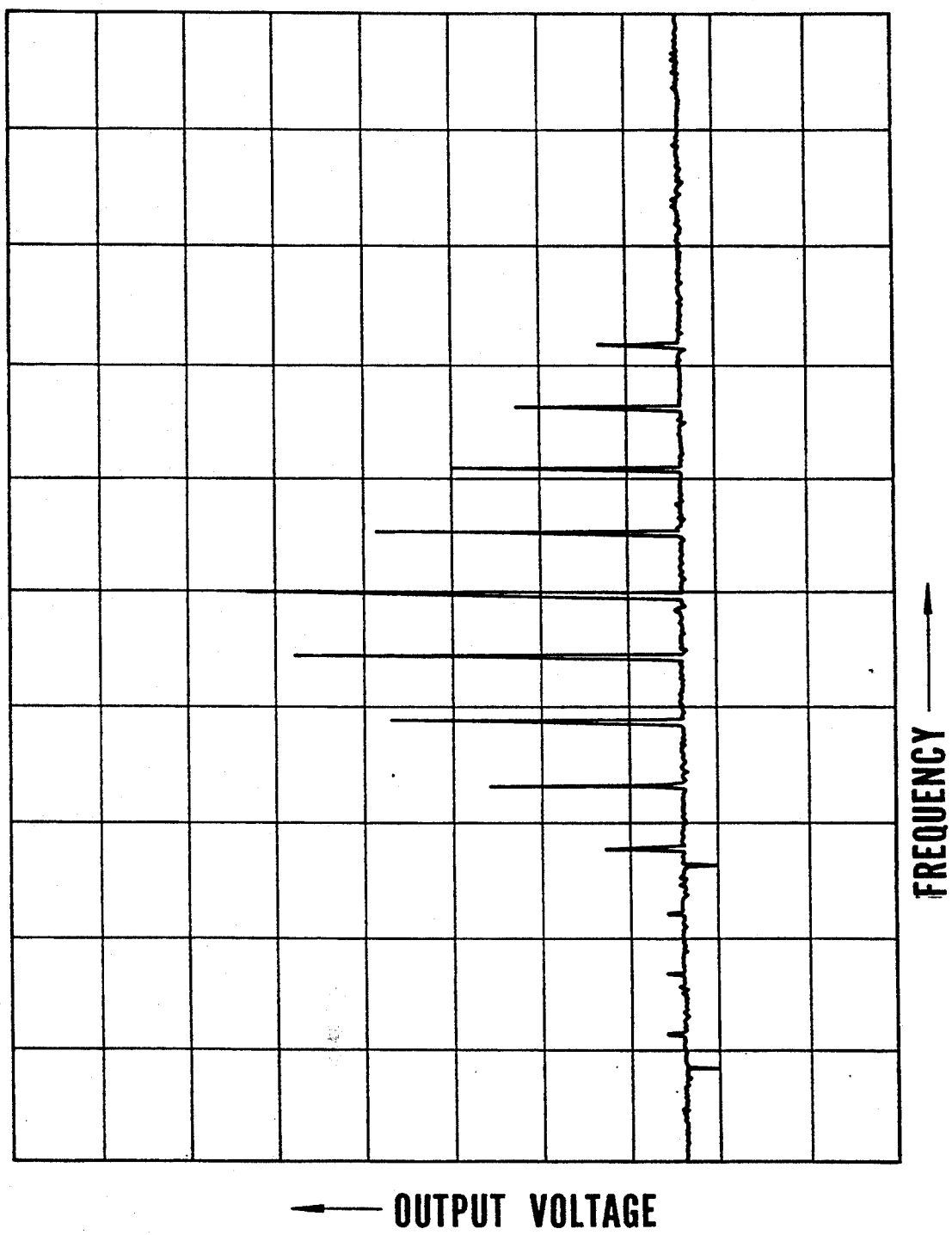
FIG. 6 is a graph, showing frequency characteristics, for explaining abnormal oscillation of the ceramic resonator element.

With an increase in oscillation frequency of the oscillator 1, the apparatus (ceramic resonator element) can be reduced in size. However, if the oscillation frequency of the oscillator 1 is set to an ultra high frequency as described above, and the impedance is increased while the Q of the ceramic resonator element 21 is kept high, mutual interference tends to occur between adjacent circuits. In addition, if a stray distributed capacitance is added to the transistor 61 of the high-impedance converter 6, or the power source line constitutes an equivalent inductance 8 as shown in FIG. 5, parasitic vibrations are produced, and an abnormal oscillating state may appear, as shown in FIG. 6. In this embodiment, the transistor 61 prevents mutual interference between the oscillator 1 and resonator 2 including the ceramic resonator element 21. Furthermore, in order to prevent abnormal oscillations due to interference of electric fields of the ceramic resonator elements 14 and 21 or to prevent abnormal oscillation due to an equivalent inductance constituted by the power source line, the following arrangement is employed.

Figure 7A:
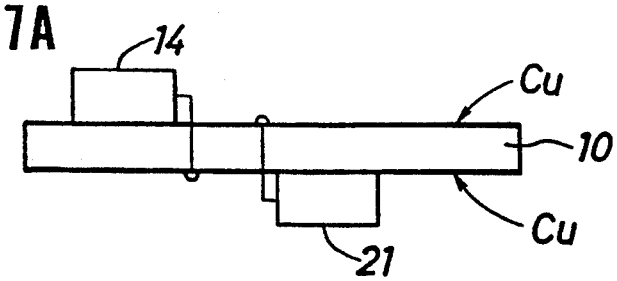
FIGS. 7A, 7B, and 7C are views showing different mounting states of the ceramic resonator elements of an oscillator and a resonator.
Figure 7B:
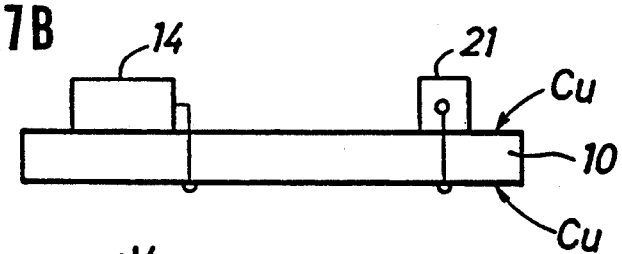

In order to prevent mutual interference between the two ceramic resonator elements 14 and 21, the following arrangements may be employed. As shown in FIG. 7A, one of the ceramic resonator elements (e.g., the ceramic resonator element 14) is arranged on a copper film on the upper surface of a ceramic substrate 10, and the other ceramic resonator element (e.g., the ceramic resonator element 21) is arranged on a copper film on the lower surface of the substrate 10, thus preventing the electric field of the ceramic resonator element 14 from influencing the ceramic resonator element 21. According to another arrangement, as shown in FIG. 7B, the ceramic resonator elements 14 and 21 are arranged on a copper film on the same surface of the ceramic substrate 10 in orthogonal directions so as to set the electric fields of the resonator elements 14 and 21 in the orthogonal directions. This prevents the electric field of the ceramic resonator element 14 from influencing the ceramic resonator element 21.

Figure 7C:
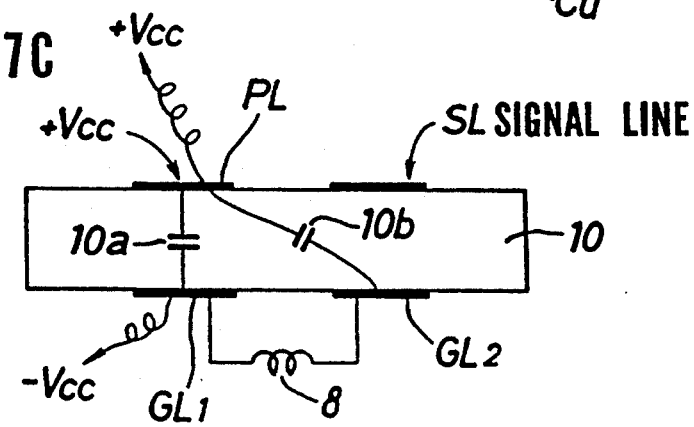
Figure 8:
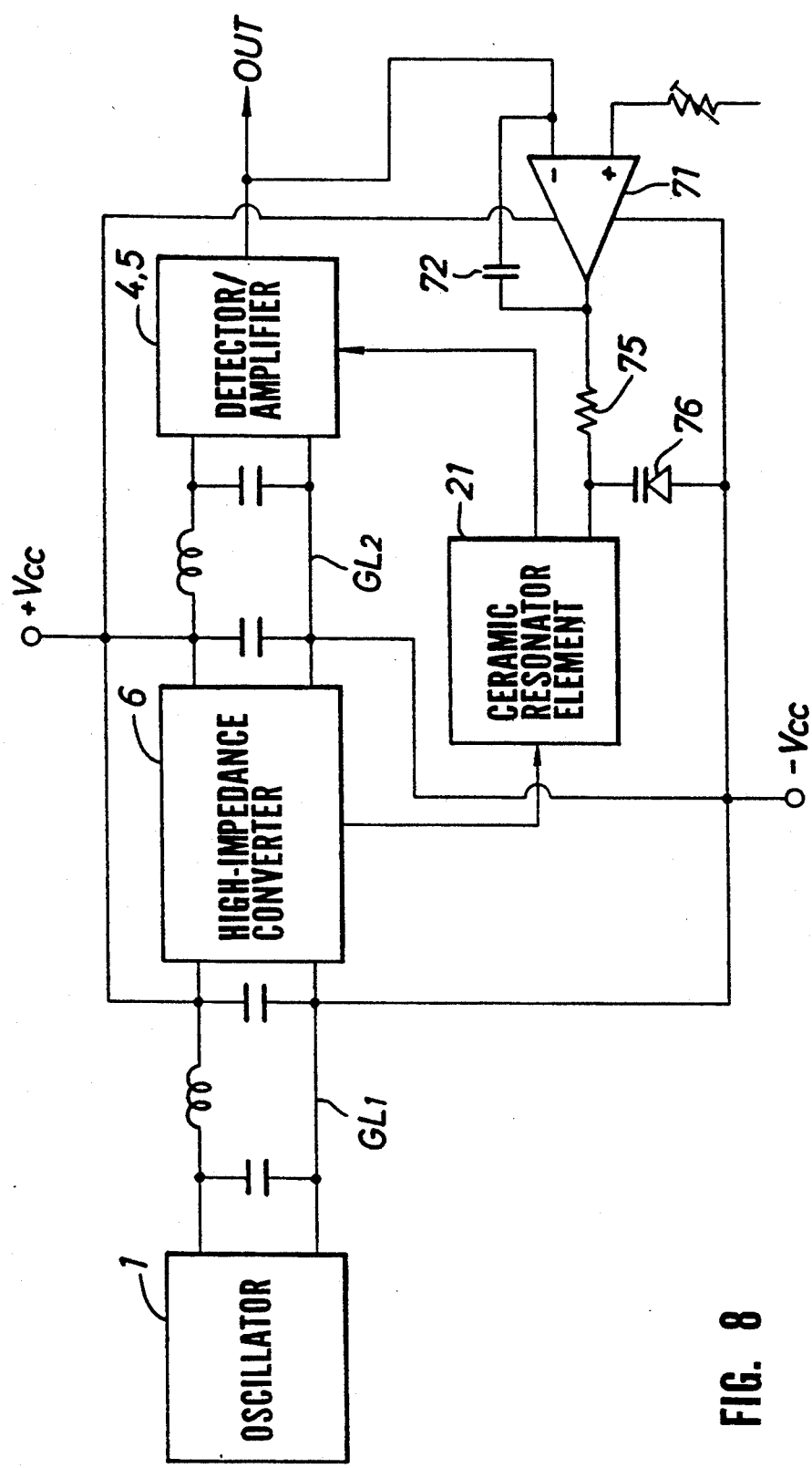
FIG. 8 is a circuit diagram showing a detailed connecting state of the circuit shown in FIG. 1.

In still another arrangement, as shown in FIG. 7C, a positive side line (+Vcc line) PL of the power source and a signal line SL are arranged on the upper surface of the ceramic substrate 10, and signal ground lines GL1 and GL2 are formed on the lower surface of the ceramic substrate 10. In this arrangement, for example, the positive line PL of the power source is arranged to oppose a ground line $GL_1$, and the signal line SL is arranged to oppose the ground line $GL_2$, thus trapping an electric field. In addition, the signal ground lines GL1 and GL2 are separated from each other through an inductance 8, and bypass capacitors 10a and 10b are respectively arranged at points between the ground lines GL1 and GL2 and the positive line PL, thereby eliminating mutual interference between the circuits. In this embodiment, in order to eliminate mutual interference of the respective circuits, the respective circuits are separated from each other in terms of electric fields, as indicated by a block diagram in FIG. 8. With this arrangement, mutual interference between the respective circuits can be reliably eliminated.

Referring to FIG. 3 again, the detector 4 is connected to resonator 2 including the ceramic resonator element 21 through a coupling capacitor 41, and is constituted by an inductance element 42, a diode 43, a capacitor 44, and a resistor 45. An output signal from resonator 2 including the ceramic resonator element 21 is supplied to the detector 4 through the coupling capacitor 41. The diode 43, the capacitor 44, and the resistor 45 constitute a detector. In this embodiment, a bias point of the operation point of the diode 43 is set to be sufficiently lower than the 0 voltage. The detector performs envelope detection of a high-frequency output signal (image signal) from resonator 2 including the ceramic resonator element 21, and converts it into a signal in the signal band of the object. In this manner, the detector detects a high-frequency signal from resonator 2 including the ceramic resonator element 21. In consideration of the characteristic impedance of the diode 43, it is apparent that the forward impedance of the diode 43 greatly influences the ceramic resonator element 21, and that if the diode 43 is directly connected to resonator 2 including the ceramic resonator element 21, the Q of resonator 2 including the ceramic resonator element 21 is undesirably decreased. In order to prevent this inconvenience, the inductance element 42 is connected to the anode side of the diode 43. That is, the capacitor 41 and the inductance element 42 serve as a high-impedance circuit.

Figure 9:
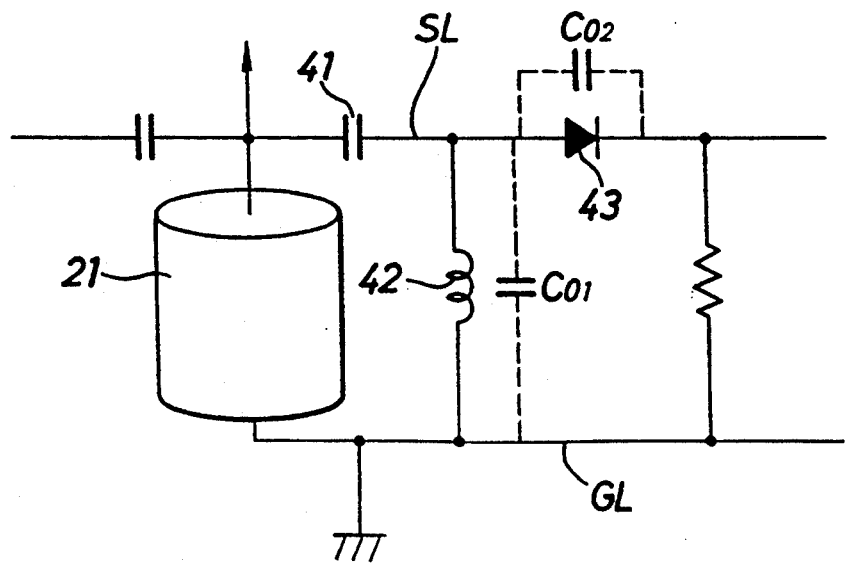
FIG. 9 is a circuit diagram showing a connecting state of a resonator and a detector of the apparatus shown in FIG. 1.

FIG. 9 shows a circuit portion constituted by the ceramic resonator element 21, the coupling capacitor 41, and the inductance element 42. A circuit of this type generally has stray capacitances $C_{01}$ and $C_{02}$ between the ground line GL and the signal line SL and between the anode and the cathode of the diode 43, respectively. The inductance element 42 effectively removes these stray capacitances $C_{01}$ and $C_{02}$. The inductance element 42 is coupled to the coupling capacitor 41 so as to constitute an LC resonator. In this case, the resonance point of the LC resonator must be set in a detected frequency band and in an oscillation frequency band so as to set a high impedance with respect to an ultra high-frequency component.

The amplifier 5 is constituted by a transistor 51 and elements such as a resistor. The amplifier 5 amplifies a signal supplied from the detector 4 and supplies it to a signal processor (not shown), and at the same time, supplies it to the AFC circuit 7.

The AFC circuit 7 comprises an operational amplifier 71, capacitors 72 and 73, a variable resistor 74, a resistor 75, a variable capacitance diode 76, and a coupling capacitor 77 as main circuit elements. The negative terminal of the operational amplifier 71 is connected to the output terminal of the amplifier 5. The positive terminal of the operational amplifier 71 is connected to the slide terminal of the variable resistor 74. The capacitor 72 is connected between the negative terminal and the output terminal of the operational amplifier 71. One end of the capacitor 73 is connected to the output terminal of the operational amplifier 71. The other end of the capacitor 73 is grounded. The output terminal of the operational amplifier 71 is connected to the output terminal of the ceramic resonator element 21 through the resistors 75 and 78 and the coupling capacitor 77. The cathode of the variable capacitance diode 76 is connected to the node between the coupling capacitor 77 and the resistor 78. The anode of the variable capacitance diode 76 is grounded.

The AFC circuit 7 amplifies a signal supplied from the amplifier 5 by using the operational amplifier 71. When this signal is to be amplified, an output signal from the operation amplifier 71 is smoothed by the capacitors 72 and 73 and becomes a substantially DC signal having a low frequency. In addition, the output signal from the operational amplifier 71 is integrated through an integrator constituted by the capacitor 73 and the resistor 75, and at the same time, a signal component having a very low frequency is applied to the variable capacitance diode 76.

The variable capacitance diode 76 is used in a reverse bias state. In this embodiment, when the power source voltage is assumed to be 12V, a reverse bias of 6 V or higher is applied to the variable capacitance diode 76 so as to set the operating point of the diode 76 at a low negative bias point with respect to the zero voltage. Note that the position of the operating point of the variable capacitance diode 76 can be adjusted at a DC level by changing the resistance of the variable resistor 74. In other words, the central operating point of the AFC circuit 7 can be variably set. The variable capacitance diode 76 changes its capacitance in accordance with a voltage applied from the integrator, and supplies this capacitance change to the ceramic resonator element 21 through the coupling capacitor 77, thus changing the resonance frequency of resonator 2 including the ceramic resonator element 21. In particular, if the resonance frequency of resonator 2 including the ceramic resonator element 21 is shifted from f" in FIG. 4 to the right for some reason, an output from resonator 2 including the ceramic resonator element 21 becomes $V_0$ or lower and falls outside the preset range of $V_0$ to $V_1$. Even in such a case, the resonance frequency $f_0$ is automatically shifted to the left by applying an AFC signal to resonator 2 including the ceramic resonator element 21, thus preventing an output from resonator 2 including the ceramic resonator element 21 from falling outside the range of $V_0$ to $V_1$. Therefore, the AFC circuit 7 also serves as an AGC circuit.

The present invention has the above-described arrangement. An operation of the present invention will be described below.

Figure 10:
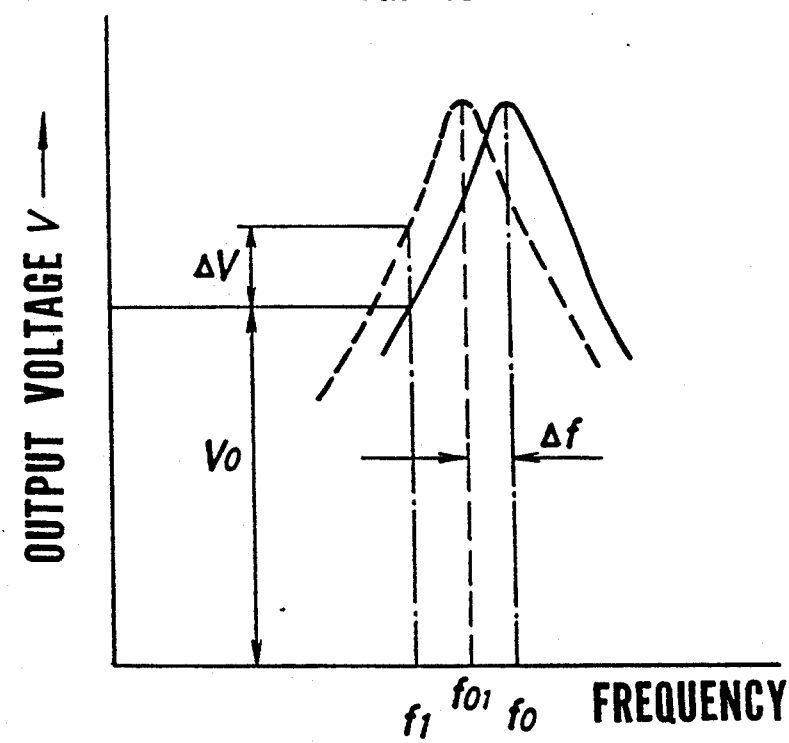
FIG. 10 is a graph for explaining an operation of the first embodiment of the present invention.
Figure 11:
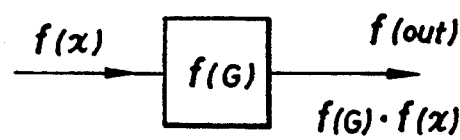
FIG. 11 is a view for explaining an example of response conversion of a signal.

Assume, as shown in FIG. 10, that the oscillation frequency $f_1$ of the oscillator 1 is set at a position slightly shifted from the resonance frequency (tuning frequency) $f_0$ of resonator 2 including the ceramic resonator element 21. In this state, if the detecting portion detects no change in capacitance between the detecting portion and an object to be detected, the constant voltage $V_0$ is output from resonator 2 including the ceramic resonator element 21. In contrast to this, if the detecting portion detects the capacitance change of $\Delta C$ when a person approaches the electrode portion of the detecting portion or an indented surface such as a surface of a VHD disk passes through a portion near the electrode portion of the detecting portion, the resonance frequency of resonator 2 including the ceramic resonator element 21 is shifted from $f_0$ and $f_{01}$. At this time, since the oscillation frequency $f_1$ is kept constant, resonator 2 including the ceramic resonator element 21 outputs a voltage of $V_0 + \Delta V$ obtained by adding $\Delta V$ to $V_0$.

It is generally known that if a signal $f(x)$ is supplied to a circuit having a given response $f(G)$, an output signal $f(out) = f(G)f(x)$ can be obtained. If this relation is applied to the embodiment, $f(out) = j\omega t_1 \pm Px$, provided that $f(x)$ is fixed at a single frequency $j\omega t_1$, i.e., an oscillation frequency, and $f(G)$ is given as a signal Px corresponding to the movement of an image signal or a person. Therefore, an AM-modulated output can be extracted. In this embodiment, if the oscillation frequency is an ultra high frequency, e.g., 1 GHz, the output $f(out)$ is an ultra high-frequency signal having a bandwidth of $\pm Px$ having 1 GHz as the center frequency. This ultra high-frequency signal is supplied to the detector. The detector performs envelope detection of the ultra high-frequency signal and converts it into the signal band of the object (in this embodiment, a 3-MHz signal). This band-converted signal is amplified by the amplifier 5 constituted by the transistor 51. Part of the output signal from the amplifier 5 is then supplied to a signal processor (not shown), and the other part of the signal is branched/supplied to the AFC circuit 7. In the AFC circuit 7, the frequency of this input signal is lowered to 400 mHz near a substantially DC level by a smoothing effect of the capacitors 72 and 73. In addition, the signal is integrated by the integrator and is supplied to the variable capacitance diode 76. The variable capacitance diode 76 changes its capacitance in accordance with the supplied signal and optimally adjusts the resonance frequency $f_0$ of resonator 2 including the ceramic resonator element 21 with this capacitance change.

According to the embodiment, since the resonator elements of the oscillator 1 and the resonator 2 are respectively constituted by the ceramic resonator elements 14 and 21, large Q values can be obtained. In addition, since the peripheral circuits of the ceramic resonator element 21, i.e., the impedance converter 6, the resonator constituted by the inductance element 42 and the capacitor 41, and the AFC circuit 7 are constituted by high-impedance circuits, no Q damping occurs during an operation of resonator 2 including the ceramic resonator element. Therefore, a small change in capacitance can be detected with high sensitivity.

Mutual interference between the oscillator 1 and resonator 2 including the ceramic resonator element 21 is prevented by the transistor 61. In addition, mutual interference due to electric fields between the ceramic resonator elements 14 and 21 is prevented, and an electric field is trapped between the ground lines GL1 and GL2 and the positive line of the power source. Therefore, mutual interference which tends to occur between the respective circuits when ultra high-frequency signals are processed can be reliably prevented. This allows the apparatus to have a high S/N ratio.

Furthermore, since the resonator elements of the apparatus of this embodiment are constituted by the ceramic resonator elements 14 and 21 without using strip lines, the apparatus can be reduced in size. In this embodiment, a very small apparatus having a size of 20 mm $\times$ 20 mm $\times$ 20 mm can be realized.

According to the apparatus of the embodiment, a small capacitance of $1 \times 10^{-3}$ to $1 \times 10^{-5}$ pF can be detected with high sensitivity. Therefore, the apparatus of the embodiment can be used not only for a conventional application, i.e., an apparatus for detecting a change in capacitance between a video disk and a stylus, but also for new applications, which can be realized only by high-sensitivity detection of small capacitances, e.g., a human body capacitance sensor (for detecting the entrance of a person into a room), a sensor mounted at high temperatures (e.g., a position sensor in a high-temperature furnace), a high-resolution rotary encoder, a small parts detecting element (e.g., an element for detecting chip capacitors and the like on a carrier tape), a gas sensor (a gas identification sensor based on the fact that a capacitance changes depending on a type of gas), a pulse sensor (a sensor for detecting a pulse by using a change in passing amount of iron contained in blood), and a sensor for detecting a phase transition point between a liquid phase and a solid phase (a sensor for detecting a change in dielectric constant at a transition point between a liquid phase and a solid phase in the state graphs of a solid, a liquid, and a gas). That is, a very small electrostatic sensor apparatus which has new functions and applications, and is highly sensitive and reliable can be realized.

In this embodiment, since the operation point of the diode 4) is set at a position sufficiently separated from the zero voltage, the following disturbance can be prevented, unlike a case wherein the operating point is set at a negative voltage near the zero voltage. If the operating point of the diode 43 is set at a position near the zero voltage, when a signal exceeds the zero voltage in amplitude and becomes a positive voltage, the variable capacitance diode 76 is rendered conductive, and the impedance of the diode 76 is decreased, resulting in a decrease in Q of resonator 2 including the ceramic resonator element 21. In contrast to this, if the operating point of the diode 43 is set at a position sufficiently separated from the zero voltage in the negative direction as in the embodiment, the diode 43 is not rendered conductive by an amplitude component of a signal, and the impedance of the diode 76 can always be kept high. This prevents Q damping of resonator 2 including the ceramic resonator element 21.

The present invention is not limited to the above-described embodiment, but can be practiced in various embodiments. In the above embodiment, the high-impedance converter 6 is constituted by a combination of the transistor 61 and resistors and the like. However, the converter 6 may be constituted by only a transistor or other circuit elements such as an operational amplifier. These circuit elements must be selected in consideration of matching with the oscillation frequency of the oscillator.

Figure 12:
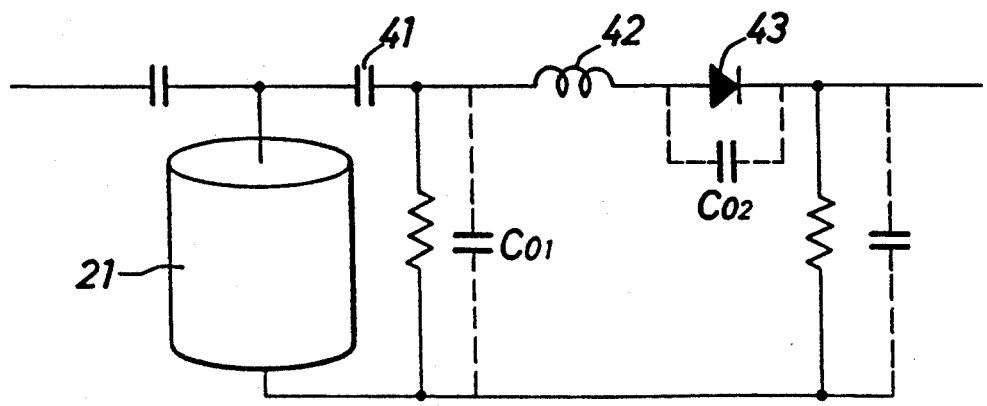
FIG. 12 is a circuit diagram showing another connecting state of an impedance element 21 connected between the ceramic resonator element of the resonator and the detector.

In the embodiment, the inductance element 42 is connected in parallel with the ceramic resonator element 21, as shown in FIG. 9. However, these components may be connected in series with each other, as shown in FIG. 12.

In the embodiment, since the resonator elements of the oscillator and the resonator are respectively constituted by ceramic resonator elements, and the high-impedance converter is interposed between these ceramic resonator elements, Q damping in the resonator can be prevented, and a small change in capacitance can be detected with high sensitivity.

In addition, since high impedances are set at the peripheral portions of the resonator, i.e., not only between the resonator and the oscillator but also between the resonator and the detector and the AFC circuit located on the signal input and output sides of the resonator, the Q of the resonator can be more reliably kept at a high level. This more effectively prevents Q damping in the resonator. That is, the ceramic resonator element can exhibit its original high performance (high Q), and a small change in capacitance can be detected with high sensitivity.

Furthermore, as described above, since the resonator elements of the oscillator and the resonator are respectively constituted by ceramic resonator elements, the apparatus can be greatly reduced in size and weight as compared with a conventional apparatus wherein resonator elements are constituted by strip lines.

Moreover, since the apparatus arrangement is simple, the high-performance apparatus of the present invention can be provided at a low cost.

Figure 13:
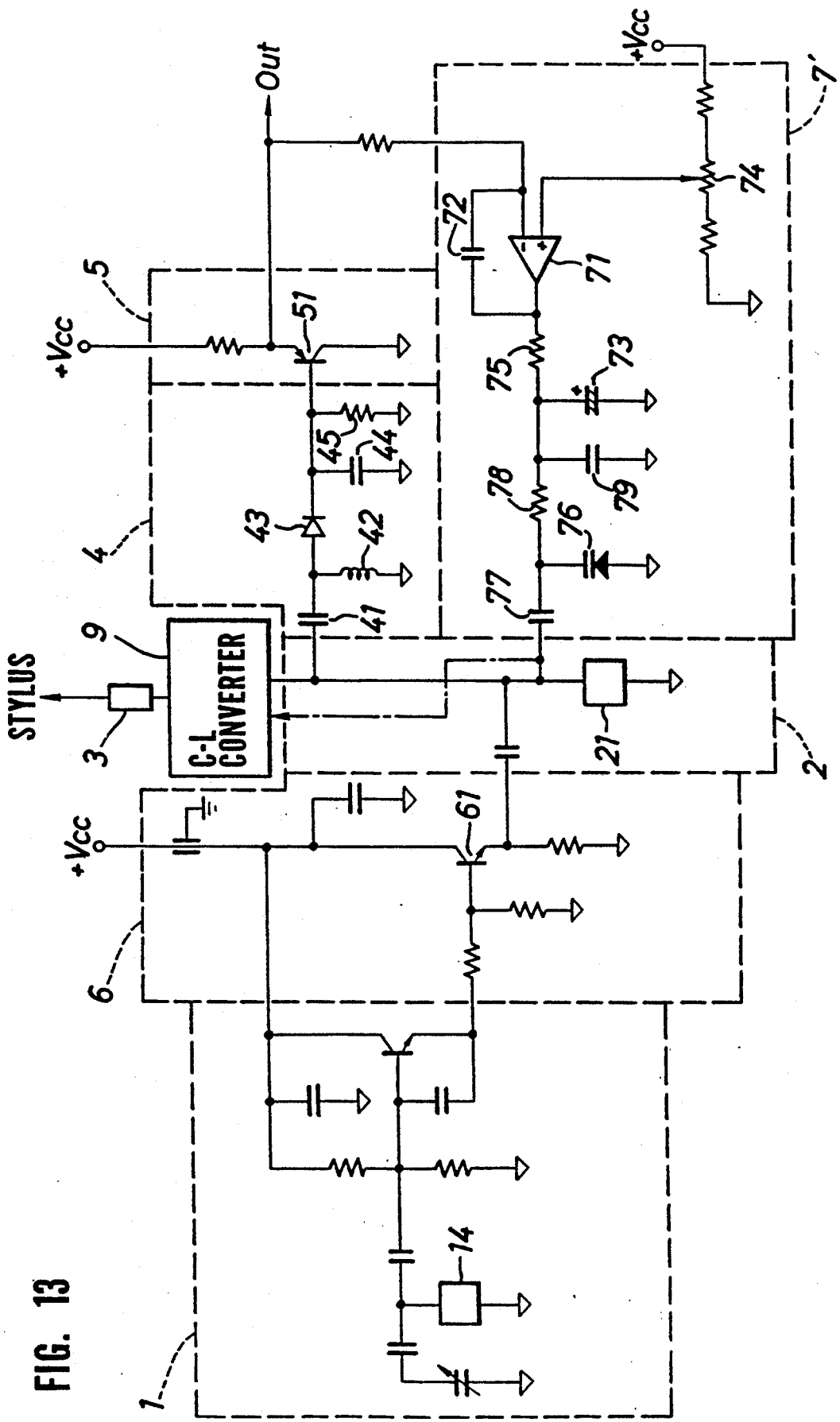
FIG. 13 is a circuit diagram showing an electrostatic sensor apparatus according to another embodiment of the present invention.

FIG. 13 is a block diagram showing an electrostatic sensor apparatus according to another embodiment of the present invention.

This embodiment is similar in circuit arrangement to the embodiment shown in FIG. 3. The same reference numerals in FIG. 13 denote the same parts as in FIG. 3, and a description thereof will be omitted.

An apparatus of this embodiment comprises an oscillator 1, a high-impedance converter 6, a resonator 2 constituted by a ceramic resonator element 21, a C-L converter 9, a detector 4, an amplifier 5, and an AFC circuit 7' as a stabilizing/control circuit. Referring to FIG. 13, in a strict sense, the resonator 2 may be considered to be constituted by the ceramic resonator element 21 and the C-L converter 9. In the specification, however, it is assumed that the resonator 2 is constituted by only the ceramic resonator element 21 without the C-L converter 9.

A detecting portion 3 is connected to the ceramic resonator element 21 through the C-L converter 9. The detecting portion 3 is connected to a desired electrode for detecting a change in capacitance between the detecting portion and an object to be detected, e.g., a plate electrode, a needle electrode, an ion electrode, an electrode coated with an insulating film, and a heat-shielding electrode.

Figure 14:
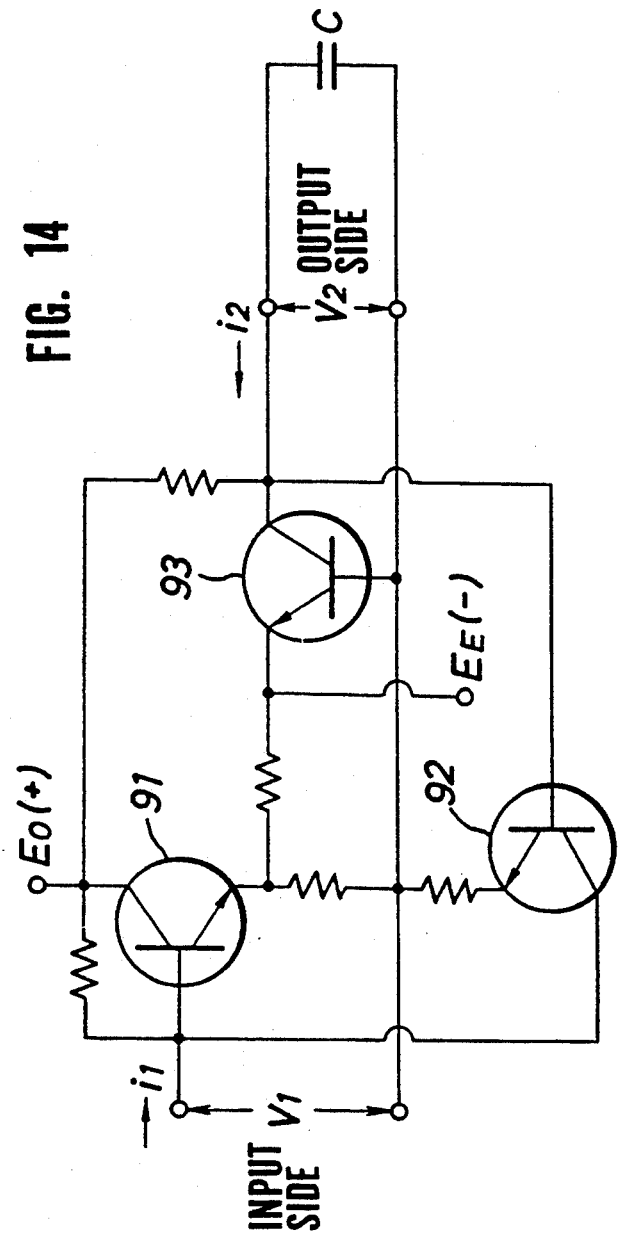
FIG. 14 is a circuit diagram showing an L-C converter of the apparatus shown in FIG. 13.

The C-L converter 9 can be constituted by an impedance gyrator using a Hall element, a waveguide or a phase non-inverting circuit. FIG. 14 shows an example of this circuit. The circuit shown in FIG. 14 is called a transistor gyrator, which is constituted by a combination of three transistors 91, 92, and 93 and resistors. The input side of the circuit is connected to the ceramic resonator element 21, and the output side is connected to the detecting portion 3. This impedance gyrator performs impedance inversion, and converts a change in capacitance on the output side into a change in inductance on the input side.

The circuit arrangement of this embodiment is different from that shown in FIG. 3 in that capacitors 73 and 79 are parallel-connected between resistors 75 and 78 and ground and that the L-C converter 9 is connected between the resonator 2 and the detecting portion 3.

In the AFC circuit 7', an output signal from an operational amplifier 71 is integrated through two integrators respectively constituted by a combination of the capacitor 73 and the resistor 75 and a combination of the capacitor 79 and the resistor 78, and at the same time, a signal component having a very low frequency is applied to a variable capacitance diode 76.

An operation of this embodiment will be described below. Since the fundamental operation is the same as that of the embodiment shown in FIG. 3, only different points will be described.

Assume, as shown in FIG. 4, that an oscillation frequency of the oscillator 1 is set at a position slightly shifted from a resonance frequency (tuning frequency) $f_0$ of resonator 2 including the ceramic resonator element 21. If the detecting portion detects no change in capacitance between the detecting portion and an object to be detected, a constant voltage of $V_0$ is output from resonator 2 including the ceramic resonator element 21. In contrast to this, if the detecting portion 3 detects a capacitance change of $\Delta C$ when a person approaches the electrode portion of the detecting portion or an indented surface such as a surface of a VHD disk passes through a portion near the electrode portion of the detecting portion, this change $\Delta C$ is converted into an inductance change by the C-L converter 9, as follows.

Figure 15:
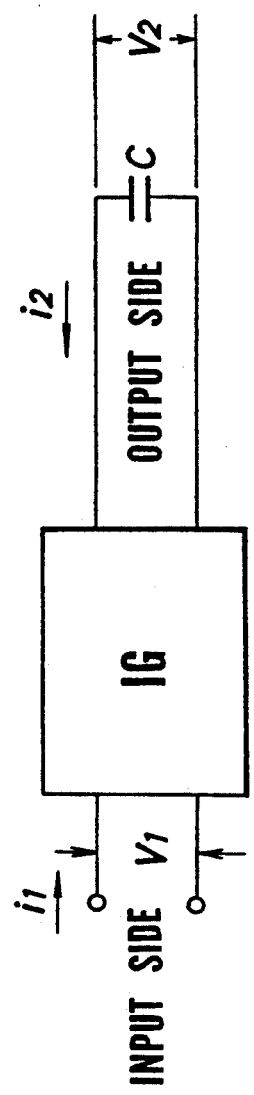
FIG. 15 is a view for explaining an operation of the L-C converter shown in FIG. 14.

Assume, as shown in FIG. 15, that the C-L converter is represented as a black box by using a Y parameter (Y matrix) obtained when the 4-terminal circuit constant of an electrical circuit is represented by a lumped constant; the conductance of the gyrator, G; the voltage and the current on the input side (on the ceramic resonator element 21 side), $V_1$ and $i_1$; and the voltage and the current on the output side (the detecting portion 3 side), $V$ and $i_2$. In this case, the currents $i_1$ and $i_2$ can be represented by the following equation which represents the characteristics of the overall gyrator:

$$\begin{pmatrix} i_1 \\ i_2 \end{pmatrix} = \begin{pmatrix} 0 & \pm G \\ \mp G & 0 \end{pmatrix} \begin{pmatrix} V_1 \\ V_2 \end{pmatrix}$$

If a capacitor is connected to the output side of this impedance gyrator, the input side of the gyrator serves as an inductance component. Therefore, the impedance change $\Delta C$ on the output side can be represented as an impedance change $\Delta Z_i$ on the input side.

$$\Delta Z_i = V_1/i_1 = j\omega C/G^2$$

where $\omega$ is the angular frequency.

As described above, the small capacitance change $\Delta C$ detected on the output side is converted into the small impedance change $\Delta Z_i$ by the C-L converter 9. This change $\Delta Z_i$ is supplied to resonator 2 including the ceramic resonator element 21. In this C-L conversion, as is apparent from the equation of $\Delta Z_i$, the impedance of the object in a stationary state does not directly influence resonance of the resonator. Upon reception of the impedance change $\Delta Z_i$, the resonance frequency of resonator 2 including the ceramic resonator element 21 is shifted from, e.g., $f_0$ to $f_1$ in FIG. 4. At this time, since the oscillation frequency $f_1$ is kept constant, resonator 2 including the ceramic resonator element 21 outputs a voltage of $V_0 + \Delta V$ obtained by adding $\Delta V$ to $V_0$.

In this embodiment, since a small change in capacitance detected by the detecting portion 3 is converted into a small change in inductance by the C-L converter 9 and is supplied to resonator 2 including the ceramic resonator element 21, even when a change in capacitance of an object having a small Q value or a low impedance is to be detected, a small change in capacitance can be detected with high sensitivity regardless of the Q or impedance of the object without decreasing the impedance or Q of resonator 2 including the ceramic resonator element 21.

In the above embodiment, an AFC signal from the AFC circuit 7' is supplied to the ceramic resonator element 21 through a coupling capacitor 77. However, the AFC signal may be supplied to the C-L converter 9 as indicated by an alternate long and short dashed line in FIG. 13 in order to stabilize the tuning point between the resonance frequency of the resonator 2 and the oscillation frequency of the oscillator 1.

Furthermore, in the above embodiment, the C-L converter is constituted by a transistor gyrator. However, the C-L converter may be constituted by other passive phase non-inverting elements.

In the present invention, the oscillation frequency is not limited to the range of 1 to 10 GHz. An optimal frequency may be selected from an MHz band or a GHz band in accordance with each specific application.

In this embodiment, since the C-L converter is interposed between the detecting portion for small capacitances and the resonator element of the resonator, even if the Q or impedance of an object to be detected is low, the resonator is free from the influences of such a low impedance. Therefore, detection of capacitances can always be performed while the Q and impedance of resonator 2 including the ceramic resonator element 21 are kept high. This enables detection of small capacitances with high sensitivity.

Since the resonator elements of the oscillator and the resonator are respectively constituted by ceramic resonator elements, the apparatus can be greatly reduced in weight and size.

Furthermore, since the stabilizing/control circuit for stabilizing the tuning point between the oscillation frequency of the oscillator and the resonance frequency of the resonator is connected to the C-L converter, the apparatus can always be operated with the tuning point located at an optimal position, and the reliability in capacitance detection can be greatly increased.

Figure 1:
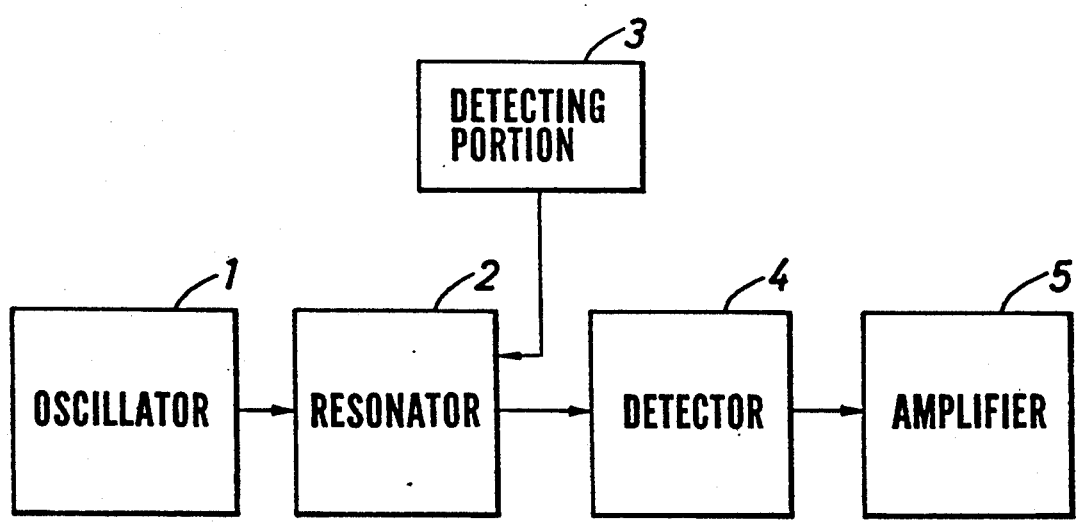
FIG. 1 is a block diagram showing a conventional electrostatic sensor apparatus of an RCA system.
Figure 2:
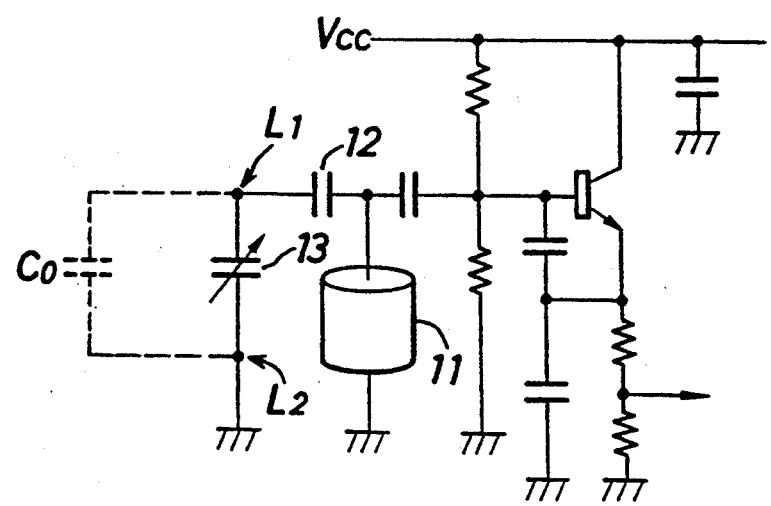
FIG. 2 is a circuit diagram of an oscillator of the electrostatic sensor apparatus which is experimentally manufactured by the present inventor.
Figure 16:
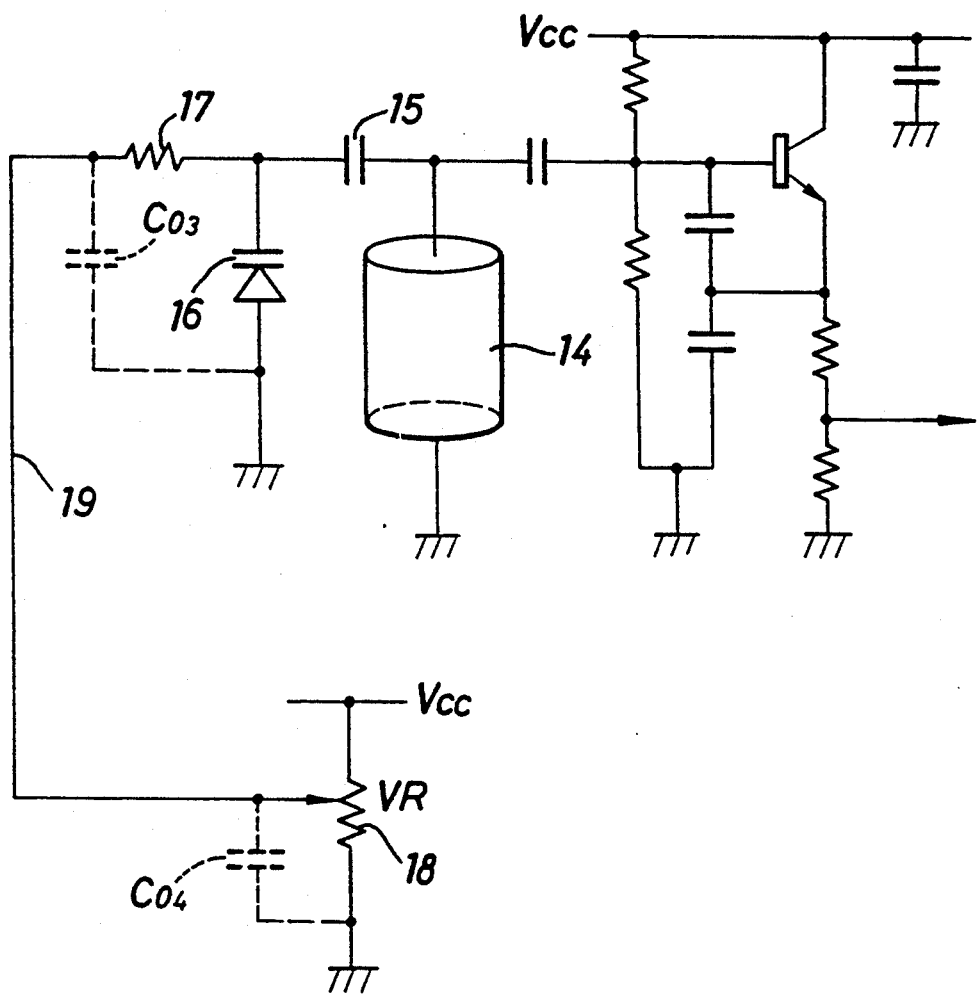
FIG. 16 is a circuit diagram showing an oscillator of an electrostatic sensor apparatus according to still another embodiment of the present invention.

FIG. 16 shows an oscillator of an electrostatic sensor apparatus according to still another embodiment of the present invention. The same reference numerals in FIG. 16 denote the same parts as in FIG. 2, and a description thereof will be omitted.

Similar to the above-described embodiments, an apparatus of this embodiment comprises an oscillator 1, a resonator 2, a detecting portion 3, a detector 4, and an amplifier 5. A ceramic resonator element 14 is used as a resonator element of the oscillator 1. The cathode of a variable capacitance diode 16 is connected to the ceramic resonator element 14 through a coupling capacitor 15. The anode of the variable capacitance diode 16 is grounded The diode 16 is arranged near the ceramic resonator element 14. A resistor 17 as a high frequency separating circuit is connected to the node between the diode 16 and the coupling capacitor 15. The other end of the resistor 17 is connected to the slide terminal of a variable resistor 18 as a variable potential converter through a lead 19. The variable resistor 18 serves to adjust an operating voltage to be applied to the variable capacitance diode 16.

An operation of the oscillator will be described below.

When the slide terminal of the variable resistor 18 is slid, the operating voltage to be applied to the variable capacitance diode 16 is changed. The diode 16 changes its capacitance in accordance with a change in operating voltage. This variable capacitance diode 16 serves as an element of the oscillator 1, and hence the oscillation frequency is changed with a change in capacitance of the diode 16. In this embodiment, therefore, the oscillation frequency can be adjusted to a predetermined target frequency by simply adjusting the operating voltage to be applied to the variable capacitance diode 16 by means of the variable resistor 18, and the tuning point of the resonator 2 can be accurately adjusted.

Since the oscillation frequency can be adjusted by changing the voltage to be applied to the variable capacitance diode 16 as described above, the resistance of the resistor 17 can be increased. With this increase in resistance, almost no DC current flows through the resistor 17, and hence the ceramic resonator element 14 is substantially free from the influences of DC current components. In addition, with the presence of the resistor 17, the ceramic resonator element 14 is substantially free even from the influences of high-frequency components because capacitance components and inductance components on the lead 19 side are grounded. Therefore, even if the lead 19 is elongated, almost no influences are exerted on the ceramic resonator element 14. This allows the variable resistor 18 to be arranged at an arbitrary position in accordance with the requirement of a user, and increases the degree of freedom in circuit design.

As described above, if an ultra high frequency is used as an oscillation frequency to obtain high sensitivity, when the electrostatic sensor apparatus is attached to a unit to be measured, the oscillation frequency is changed due to the influences of a stray distributed capacitance and the like between the apparatus and the unit. According to the apparatus of this embodiment, however, even if such a stray distributed capacitance is produced, an oscillation frequency deviation can be easily corrected by changing the operating voltage to be applied to the variable capacitance diode 16, thus always allowing accurate adjustment of a tuning point.

Since the apparatus of this embodiment includes no trimmer capacitor which tends to be large in size and expensive, the apparatus can be further reduced in size and cost.

The present invention is not limited to above-described embodiments, but can be practiced in various embodiments.

In this embodiment, the high frequency separating circuit is constituted by the resistor 17. However, this circuit may be constituted by a high-impedance coil.

According to this embodiment, as described above, even if the lead 19 is elongated, an oscillating operation can be performed with almost no influences of capacitance components and inductance components produced at the lead 19. However, if the lead 19 is greatly elongated, capacitors "CO$_3$" and "CO$_4$" are connected to the two ends of the lead 19 in order to quickly ground capacitance components and inductance components produced at the lead 19 and to further stabilize an oscillating operation by completely eliminating the adverse factors, i.e., the capacitance components and the like.

In this embodiment, the oscillation frequency is adjusted by variably adjusting the operating voltage of the variable capacitance diode. Therefore, even if the oscillation frequency is changed due to slight variations in shape of the dielectric resonator element of the oscillator or a stray distributed capacitance produced when the electrostatic sensor apparatus is mounted in a unit to be measured, the oscillation frequency can be easily adjusted to a predetermined target frequency by adjusting the operating voltage to be applied to the variable capacitance diode.

In addition, since the high frequency separating circuit is arranged between the variable potential converter and the variable capacitance diode, even if the lead extending from the high frequency separating circuit to the variable capacitance diode is elongated, the resonator element of the oscillator is free from the influences of capacitance components and inductance components produced at the lead. Hence, the oscillation frequency can be stabilized. Since the oscillation frequency does not vary depending on the length of the lead, no limitations are imposed on the mounting position of the variable potential converter. This greatly increases the degree of freedom in circuit design.

Furthermore, since the oscillator does not require a large, expensive trimmer capacitor as a constituting component, it can be sufficiently reduced in size and cost. Therefore, the electrostatic sensor apparatus is also reduced in size and cost.

Figure 17:
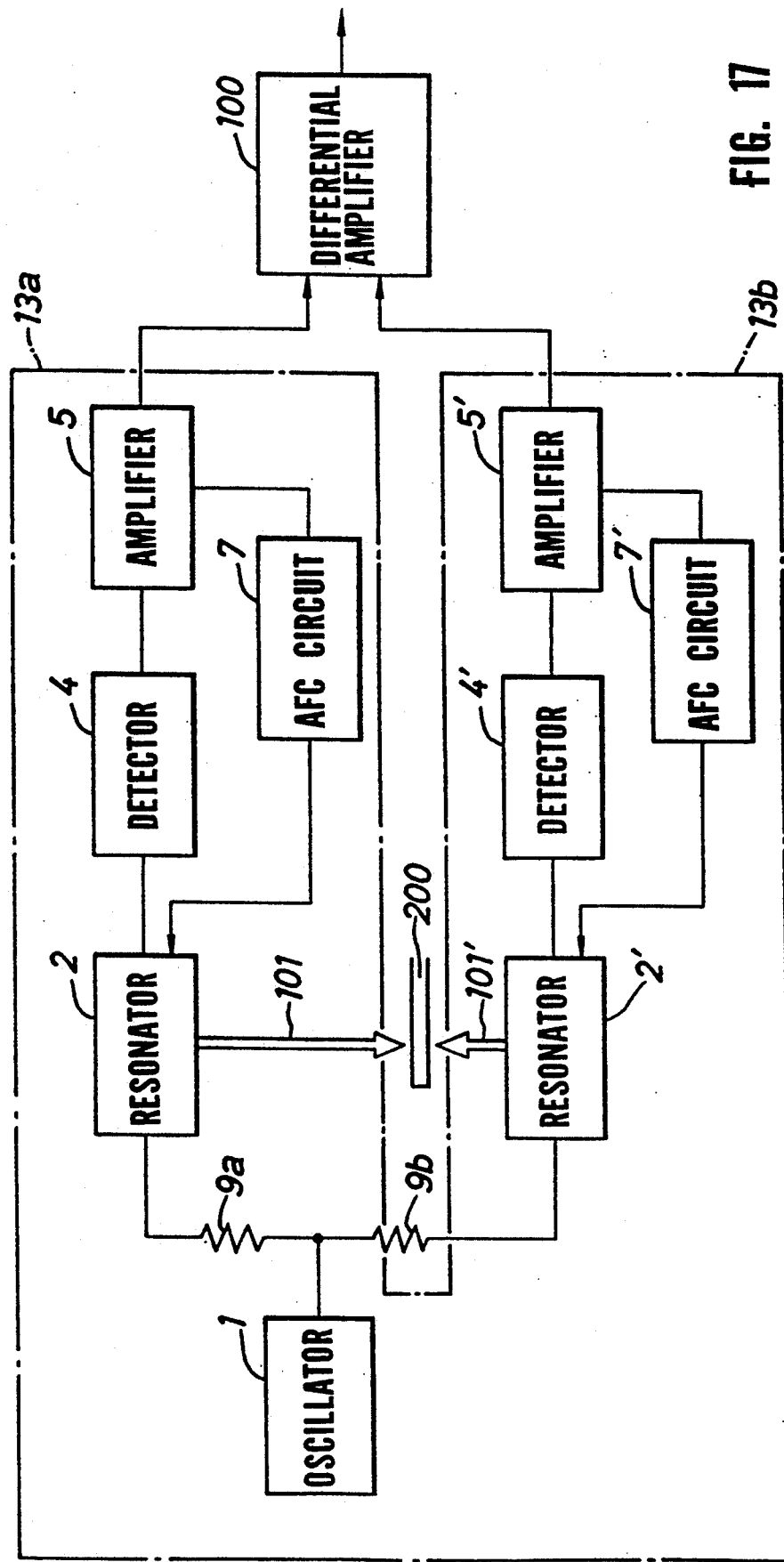
FIGS. 17 and 18 are block diagrams respectively showing two different embodiments of a multiple electrostatic sensor apparatus as other forms of the electrostatic sensor of the present invention.

FIG. 17 shows an embodiment of a multiple electrostatic sensor apparatus as another aspect of the electrostatic sensor apparatus of the present invention.

An apparatus of this embodiment comprises the following two sensor circuit systems connected adjacent to each other: a sensor circuit system 13a constituted by an oscillator 1, a resonator 2, a detector 4, an amplifier 5, and an AFC circuit 7, and a sensor circuit system 13b commonly including the oscillator 1 and constituted by a resonator 2', a detector 4', an amplifier 5', and an AFC circuit 7'. Output signals from the two sensor circuit systems are supplied to a differential amplifier 100 so as to obtain a differential output.

Each sensor circuit system has substantially the same circuit arrangement as that shown in FIG. 3. A high-frequency oscillation signal from the common oscillator 1 of the respective sensor circuit systems is supplied to the resonators 2 and 2' from the output side of a high-impedance converter 6 through distribution resistors. Since other portions of the circuit arrangement of each sensor circuit system are the same as those described with reference to FIG. 3, a description thereof will be omitted.

A circuit operation will be described below.

Figure 19:
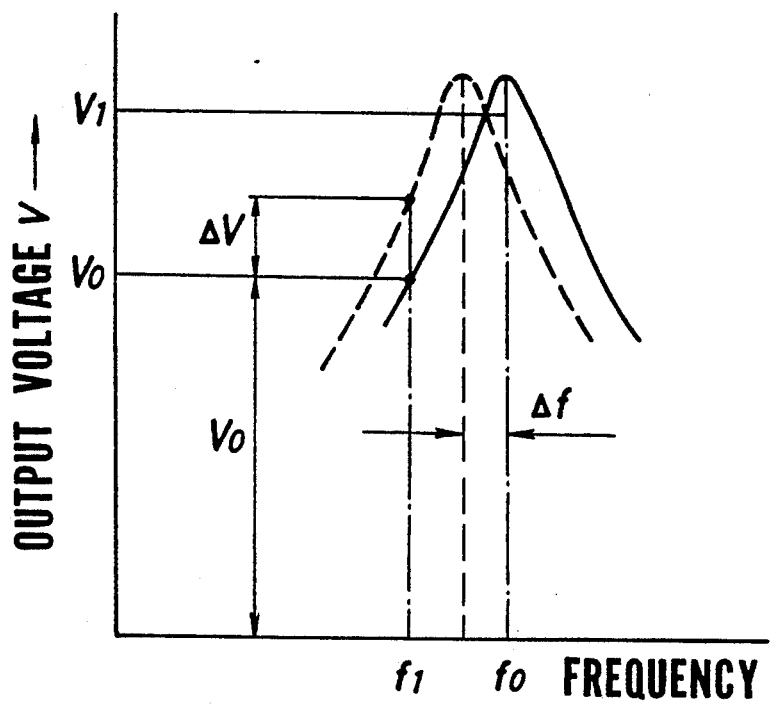
FIG. 19 is a graph for explaining a detecting operation of a small capacitance by using the electrostatic sensor apparatus.

Assume, as shown in FIG. 19, that an oscillation frequency $f_1$ of the oscillator 1 is set at a position slightly shifted from a resonance frequency (tuning frequency) of a resonators 2, 2'. In this state, if, for example, an object 200 to be detected is moved, detecting needles 101 and 101' of detecting portions detect small changes in capacitance between the needles and the object 200, and the resonance points (tuning points) of the resonators 2 and 2' are shifted by $\Delta f_1$ and $\Delta f_1'$. In the resonators 2 and 2', the oscillation frequency $f_1$ and the resonance frequency changes $\Delta f_1$ and $\Delta f_1'$ of the resonator 2 and 2' are respectively multiplied. More specifically, in the first sensor circuit system 13a, the signal having the oscillation frequency $f_1$ is multiplied with the resonance point change component $\Delta f_1$. In the second sensor circuit system 13b, the signal having the oscillation frequency fl is multiplied with the resonance point change component $\Delta f_1$. With this operation, so-called AM modulation is performed. In this embodiment, if the oscillation frequency is set to be an ultra high frequency, e.g., 1 GHz, the modulated signal of each system is an ultra high-frequency signal having a bandwidth with 1 GHz as the center frequency and corresponding to the movement of the object 200. These ultra high-frequency signals are respectively supplied to the detectors 4 and 4'. The detectors 4 and 4' perform envelope detection of the ultra high-frequency signals and convert them into single bands (in this embodiment, 3-MHz signals). These band-converted signals are respectively amplified by the amplifiers 5 and 5'. Portions of the output signals from the amplifiers 5 and 5' are supplied to the differential amplifier 100 as an output circuit, and other portions of the output signals are respectively branched/supplied to the AFC circuits 7 and 7'. In each of the AFC circuits 7 and 7', the frequency of the input signal is lowered to 400 mHz near a substantially DC level by a smoothing effect of capacitors 72 and 73. In addition, the signal is integrated by an integrator and is supplied to a variable capacitance diode 76. The variable capacitance diode 76 changes its capacitance in accordance with the supplied signal so as to optimally adjust the resonance frequency $f_0$ of the resonators 2, 2'.

The differential amplifier 100 obtains the difference between the signal supplied from the amplifier 5 of the first system and the signal supplied from the amplifier 5' of the second system. The amplifier 100 then amplifies the difference and supplies it, as a single differential detection signal, to a signal processor (not shown) or the like.

In the embodiment shown in FIG. 17, as described above, since the oscillator 1 is commonly arranged for the two sensor circuit systems 13a and 13b, the apparatus is completely free from the problem of mutual interference in which the oscillation frequencies of the respective systems resonate to produce beat frequencies. Therefore, the apparatus can perform signal processing with high precision and reliability in a region where high-sensitivity detection is required, e.g., in an electrostatic microphone, a human body sensor, and a rotary encoder.

In addition, since only one oscillator is required for a plurality of sensor circuit systems as described above, the apparatus can be greatly reduced in size and weight as compared with a case wherein an oscillator is arranged for each system.

In this embodiment, the apparatus is constituted by the two sensor circuit systems 13a and 13b. However, an even number of sensor circuit systems may be arranged in pairs so that a differential output can be obtained by each pair. In addition, in this embodiment, a differential output between detection data from the sensor circuit systems 13a and 13b is obtained. However, one of the systems may be used as a compensating circuit so that a differential output between a detection signal and a compensation signal can be obtained.

Figure 18:
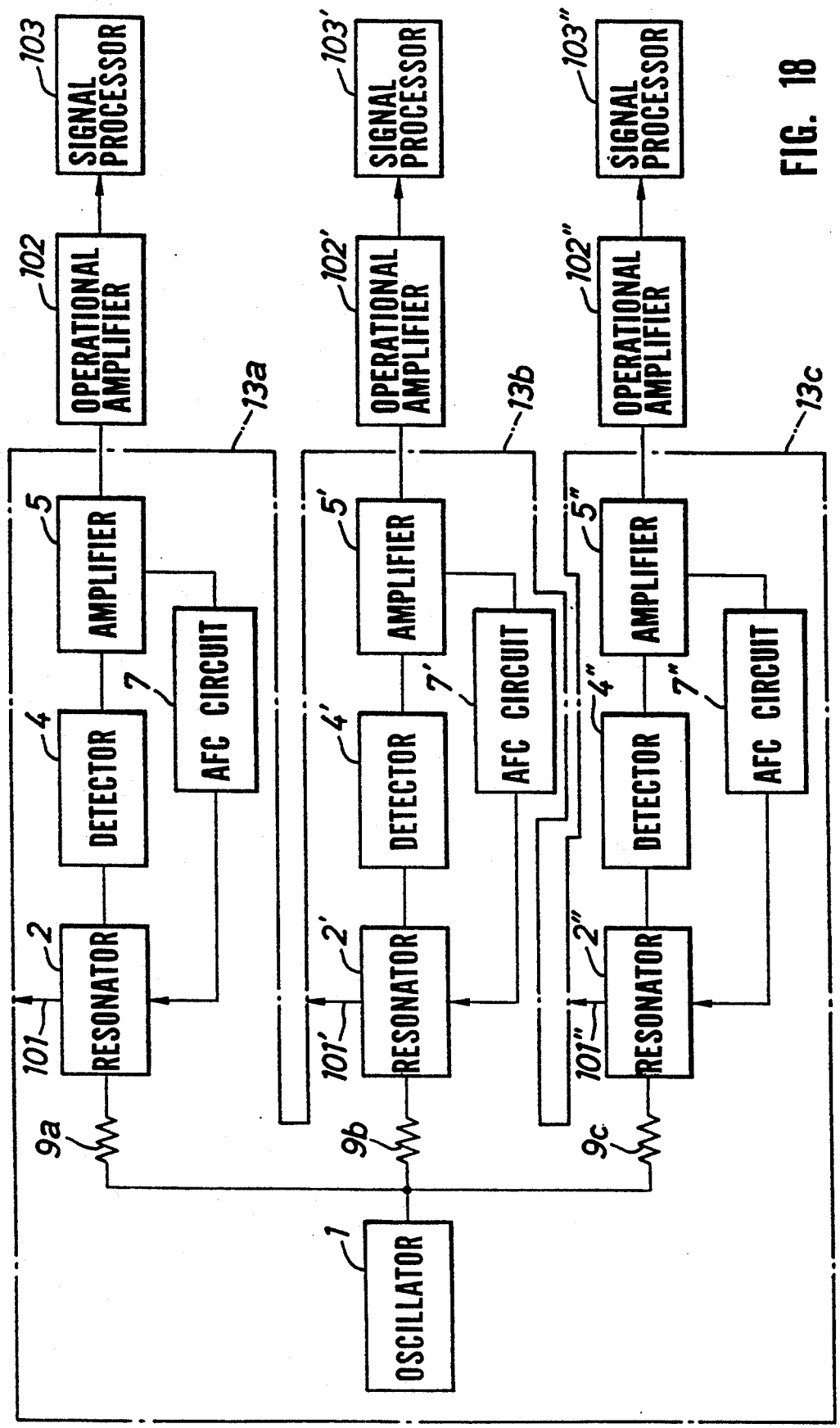

FIG. 18 shows another embodiment of the multiple electrostatic sensor apparatus as another aspect of the electrostatic sensor apparatus of the present invention.

In this embodiment, a plurality of sensor circuit systems 13a, 13b, and 13c are arranged adjacent to each other for a common oscillator 1. Operational amplifiers 102, 102′, and 102″ are respectively connected to the output terminals of amplifiers 5, 5′, and 5″ of the sensor circuit systems 13a, 13b, and 13c. Output signals from the respective sensor circuit systems 13a, 13b, and 13c are independently amplified by the operational amplifiers 102, 102′, and 102″. The amplified signals are respectively supplied to corresponding signal processors 103, 103′, and 103″. Other arrangements are the same as those of the embodiment in FIG. 17.

In this embodiment, after detection signals of small capacitances detected by the sensor circuit systems 13a, 13b, and 13c are respectively amplified by the operational amplifiers 102, 102′, and 102″, these signals are subjected to parallel processing in the corresponding signal processors 103, 103′, and 103″.

The present invention is not limited to the above-described embodiments, but can be practiced in various embodiments. In this embodiment, a resonator element 14 of the oscillator 1 and resonator elements 21 of resonators 2, 2′, and 2″ are respectively constituted by dielectric resonator elements. If both the resonator elements of the oscillator and the tuning circuit or the resonator element on the tuning circuit side alone are or is constituted by dielectric resonator elements, the apparatus can be reduced in size. More specifically, if a resonator element is constituted by a strip line, this strip line must have a length at least ¼ the wavelength of an oscillation frequency and hence is elongated. This increases the apparatus in size. In contrast to this, if each resonator element is constituted by a dielectric element as in each embodiment, each resonator element can be reduced to $\epsilon^{-\frac{1}{2}}$ the size of a resonator element constituted by a strip line, provided that the dielectric constant of each dielectric resonator element is represented by $\epsilon$. If each dielectric resonator element is constituted by a ceramic resonator element, since ceramics have dielectric constants $\epsilon$ of 40 to 90, the apparatus can be greatly reduced in size. The present inventor compared the resonator elements of an oscillator and a tuning circuit which are constituted by strip lines with those constituted by ceramic resonator elements. It was confirmed that if a resonator element is constituted by a ceramic resonator element, the size and the weight can be respectively reduced to 1/6 and 1/10 those of a resonator element constituted by a strip line. In addition, since the Q of a ceramic element is high, an increase in sensitivity can be expected as compared with a resonator element constituted by a strip line.

Another embodiment of the present invention may be designed such that a plurality of sensor circuits are formed with one common oscillator 1. In this arrangement, a differential output is obtained by each pair of sensor circuits of one group, while parallel processing of signals are performed by sensor circuits of the other group.

In each embodiment, the detector is constituted by an envelope detector. However, the detector may be constituted by a peak detector.

According to the present invention, since a plurality of sensor circuit systems are formed to have one common oscillator, no mutual interference occurs between the oscillation frequencies of the respective systems. This allows each sensor circuit system to perform desired signal processing with high precision.

In addition, since only one oscillator is required for a plurality of sensor circuit systems, the apparatus can be simplified in arrangement, and can be greatly reduced in size and weight as compared with a case wherein an oscillator is arranged for each sensor circuit system.

Furthermore, if both the resonator elements of an oscillator and a tuning circuit independent of the oscillator are constituted by dielectric resonators, or the resonator element of the tuning circuit is constituted by a dielectric resonator, the apparatus can be further reduced in size and weight. In addition, the detection sensitivity of the apparatus can be increased.

Moreover, as described above, since no mutual interference occurs between the oscillation frequencies of the respective sensor circuit systems, the respective systems can be arranged to be close to each other, thus increasing the packing density of circuits.

What is claimed is:

1. A ceramic resonance type electrostatic sensor apparatus comprising an oscillator including a ceramic resonator, said first ceramic resonator having a fixed resonance frequency, and said oscillator to oscillate at a fixed frequency; a detecting unit for detecting capacitance between said detecting unit and an object to be detected; a resonating circuit including a second ceramic resonator and having a resonance point which varies with a small change in capacitance detected by said detecting unit, a high-impedance circuit connected between said oscillator and said resonating circuit and a high-impedance circuit connected between said resonating circuit and said detecting circuit thereby eliminating mutual interference between said oscillator and said resonating circuit.

2. The apparatus according to claim 1 wherein said first high-impedance circuit includes a transistor which is of an emitter-follower type connected to said second ceramic resonator of said resonating circuit.

3. The apparatus according to claim 1 wherein said second high-impedance circuit comprises a capacitor and an inductor connected to said second ceramic resonator of said resonating circuit.

4. The apparatus according to claim 1 wherein an AFC circuit having a reverse-biased variable capacitance diode is connected between said second ceramic resonator of said resonating circuit and said detecting circuit.

5. A ceramic resonance type electrostatic sensor apparatus comprising:
- an oscillator adapted for oscillating at a fixed frequency, including a first ceramic resonator having a fixed resonance point;
- a detecting unit for detecting capacitance between said detecting unit and an object to be detected;
- a C-L converter for converting the capacitance detected by said detecting unit into inductance;
- a resonating circuit including a second resonator having a resonance point which varies with a small change in inductance output from said C-L converter; and
- a high-impedance circuit connected between said oscillator and said resonating circuit and a high-impedance circuit connected between said resonating circuit and said detecting circuit.

6. The apparatus according to claim 1 further comprising a ceramic substrate having a metal film on both a first and second surface of said ceramic substrate, said first and second ceramic resonators being arranged thereon.

7. The apparatus according to claim 6 wherein one of said ceramic resonators is arranged on one of said metal films, and the other of said ceramic resonators is arranged on the other of said metal films, thereby preventing an electric field of one of said ceramic resonators from interfering with the other of said ceramic resonators.

8. The apparatus according to claim 6 wherein both said ceramic resonators are arranged on the metal film on a same surface of said substrate is orthogonal directions.

9. The apparatus according to claim 6 wherein a positive side line of a power source and signal line are arranged on the first surface of said ceramic substrate and separated ground lines are formed on said second surface of said ceramic substrate and an inductance coil is connected between said separated ground lines.

10. A ceramic resonance type electrostatic sensor apparatus comprising a variable capacitance diode connected to said ceramic resonator through a capacitor, a variable potential converter for variably adjusting an operating voltage to be applied to said variable capacitance diode, and a high frequency separating circuit connected between said variable potential converter; and wherein said oscillator includes a first ceramic resonator, said first ceramic resonator having a fixed resonance frequency, and said oscillator is adapted to oscillate at a fixed frequency; a detecting unit for detecting a capacitance between said detecting unit and an object to be detected; a resonating circuit including a second ceramic resonator and having a resonance point which varies with the small change in capacitance detected by said detecting unit, and high-impedance circuits for respectively connecting to input and output stages of said second ceramic resonator of said resonating circuit thereby eliminating mutual interference between said oscillator and said resonating circuit.

11. The apparatus according to claim 10 wherein said variable potential converter comprises a variable resistor.

12. The apparatus according to claim 10 wherein said high frequency separating circuit comprises a resistor having a high resistance.

13. The apparatus according to claim 10 wherein said high frequency separating circuit comprises a high impedance coil.

14. The apparatus according to claim 10 further comprising an elongated lead means for connection between said high frequency separating circuit and said variable potential converter.

15. The apparatus according to claim 14 further comprising capacitors for connecting both end portions of said lead means thereby grounding capacitance components and inductance components which are formed on the lead means.

16. A dielectric resonance type electrostatic sensor apparatus, comprising:

an oscillator including a first dielectric resonator for oscillating at a predetermined frequency;
a detecting means for detecting a capacitance between said detecting means and an object to be detected;
a resonating circuit including a second dielectric resonator and having a resonance frequency which is shifted with the small change in capacitance detected by said detecting means;
a high-impedance converter for connecting between said oscillator and said resonating circuit whereby eliminating mutual interference between said oscillator and said resonating circuit;
a detecting circuit for detecting an output from said resonating circuit; and
a high-impedance circuit for connection between said resonating circuit and said detecting circuit.

17. The apparatus according to claim 16 wherein said high-impedance converter comprises a high impedance circuit.

18. The apparatus according to claim 17 wherein said high-impedance circuit includes a transistor which is of an emitter follower type connected to said resonating circuit.

19. The apparatus according to claim 16 wherein said high-impedance circuit comprises a coupling capacitor connected between said resonating circuit and said detecting circuit and an inductance element coupled to said capacitor so as to constitute an LC resonator.

20. The apparatus according to claim 19 wherein said inductance element is connected in parallel with said second dielectric resonator.

21. The apparatus according to claim 19 wherein said inductance element is connected in series with said coupling capacitor.

22. A dielectric resonance type electrostatic sensor apparatus, comprising:

an oscillator including a first dielectric resonator for oscillating at a predetermined frequency;
a detecting means for detecting a capacitance between said detecting means and an object to be detected;
a resonating circuit including a second dielectric resonator and having a resonance frequency which is changed with the small change in capacitance detected by said detecting means;
a high impedance converter for connecting between said oscillator and said resonating circuit, thereby eliminating mutual interference between said oscillator and said resonating circuit;
a detecting circuit for detecting an output from said resonating circuit;
an AFC circuit for connection between said resonating circuit and said detecting circuit; and
a high impedance circuit for connection between said resonating circuit and said detecting circuit.

23. The apparatus according to claim 22 wherein said high-impedance circuit comprises a coupling capacitor connected between said resonating circuit and said detecting circuit and an inductance element coupled to said capacitor so as to constitute an LC resonator.

24. The apparatus according to claim 22 wherein said AFC circuit comprises a reverse-biased variable capacitance diode which varies the resonance frequency of said resonating circuits.

* * * * *

UNITED STATES PATENT AND TRADEMARK OFFICE
CERTIFICATE OF CORRECTION

PATENT NO. : 5,231,359
DATED : July 27, 1993
INVENTOR(S) : Masuda et al.

It is certified that error appears in the above-indentified patent and that said Letters Patent is hereby corrected as shown below:

At Claim 1, line 13 (column 18, line 37) delete "said detecting circuit" and insert in its place --a detecting circuit--.

At Claim 5, line 17 (column 19, line 2) delete "said detecting circuit" and insert in its place --a detecting circuit--.

At Claim 1, line 5, (column 18, line 29) insert "a" between "detecting" and "capacitance".

Signed and Sealed this

Fourth Day of October, 1994

Attest:

BRUCE LEHMAN

Attesting Officer
Commissioner of Patents and Trademarks